(12) United States Patent
Ramsey et al.

(10) Patent No.: US 9,230,224 B2
(45) Date of Patent: Jan. 5, 2016

(54) PROVIDING A TIMELINE CONTROL IN A MULTI-TENANT DATABASE ENVIRONMENT

(75) Inventors: Michael Ramsey, Foster City, CA (US);
Marco S. Casalaina, San Francisco, CA (US); Arvind Krishnan, San Francisco, CA (US); Jason A. Ellis, Geneva, IL (US)

(73) Assignee: salesforce.com, inc., San Francisco, CA (US)

( * ) Notice: Subject to any disclaimer, the term of this patent is extended or adjusted under 35 U.S.C. 154(b) by 1157 days.

(21) Appl. No.: 12/977,588

(22) Filed: Dec. 23, 2010

(65) Prior Publication Data

US 2011/0283224 A1    Nov. 17, 2011

Related U.S. Application Data

(60) Provisional application No. 61/333,700, filed on May 11, 2010.

(51) Int. Cl.
*G06F 3/048* (2013.01)
*G06Q 10/06* (2012.01)
*G06F 3/0485* (2013.01)

(52) U.S. Cl.
CPC ............ *G06Q 10/06* (2013.01); *G06F 3/04855* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |

(Continued)

*Primary Examiner* — Matt Kim
*Assistant Examiner* — Tuan S Nguyen
(74) *Attorney, Agent, or Firm* — Ingrassia Fisher & Lorenz, P.C.

(57) ABSTRACT

A system and method for providing a timeline control in a multi-tenant database system. In one embodiment, a method includes determining a plurality of entitlement processes and milestones that are to be enforced, where each entitlement process includes one or more actions, and where each action is associated with a corresponding milestone. The method further includes displaying a timeline control window that shows one or more milestones for an entitlement process, and updating the timeline control window as the status of the entitlement process changes.

18 Claims, 10 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0069578 A1* | 3/2006 | Borkowski et al. ............... 705/1 |
| 2007/0192157 A1* | 8/2007 | Gooch ............... 705/9 |
| 2008/0243629 A1* | 10/2008 | Chang et al. ............... 705/26 |
| 2010/0185474 A1* | 7/2010 | Frank ............... 705/7 |
| 2011/0145012 A1* | 6/2011 | Nightingale et al. ............... 705/3 |

\* cited by examiner

PROVIDING A TIMELINE CONTROL IN A MULTI-TENANT DATABASE ENVIRONMENT

CLAIM OF PRIORITY

This application claims the benefit of U.S. Provisional Patent Application 61/333,700 entitled, "Methods and Systems for Displaying a Timeline Control in a Multi-Tenant Database Environment," filed May 11, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. The database system may store resources for providing support for customers. Even with such resources, providing adequate support to customers can be costly and difficult to achieve.

BRIEF SUMMARY

Embodiments provide mechanisms and methods for providing a timeline control in a multi-tenant database system. In one embodiment, a method includes determining a plurality of entitlement processes and milestones that are to be enforced, where each entitlement process includes one or more actions, and where each action is associated with a corresponding milestone. The method further includes displaying a timeline control window that shows one or more milestones for an entitlement process, and updating the timeline control window as the status of the entitlement process changes.

While one or more implementations and techniques are described, one or more embodiments may be implemented in a system having an application server providing a front end for an on-demand database service capable of supporting multiple tenants. The embodiments described herein are not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Embodiments described herein may also include embodiments that are only partially mentioned or alluded to, or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the embodiments described are not limited to the examples depicted in the figures.

FIG. 8 illustrates an example screen shot that includes a case milestones summary window 800, according to one embodiment.

DETAILED DESCRIPTION

General Overview

Systems and methods are provided for providing a timeline control in a multi-tenant database environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for providing a timeline control in a multi-tenant database environment will be described with reference to example embodiments.

System Overview

Embodiments described herein enable, facilitate, and manage entitlements in a database environment such as an on-demand database services system. Such an on-demand services system may be based on a multi-tenant cloud computing model. In one embodiment, the system maintains entitlements, verifies whether particular customers or end-customers are eligible for the entitlements, and enforces the entitlements based on the service level definitions. These aspects are described in detail below in connection with FIGS. 1-3.

To further facilitate the management of entitlements, the system displays a timeline control window that shows one or more milestones that are to be enforced, where each entitlement process includes one or more actions, and where each action is associated with a corresponding milestone. The method further includes updating the timeline control window as the status of the entitlement process changes. These aspects are described in detail below in connection with FIGS. 4-8.

Figure 1:
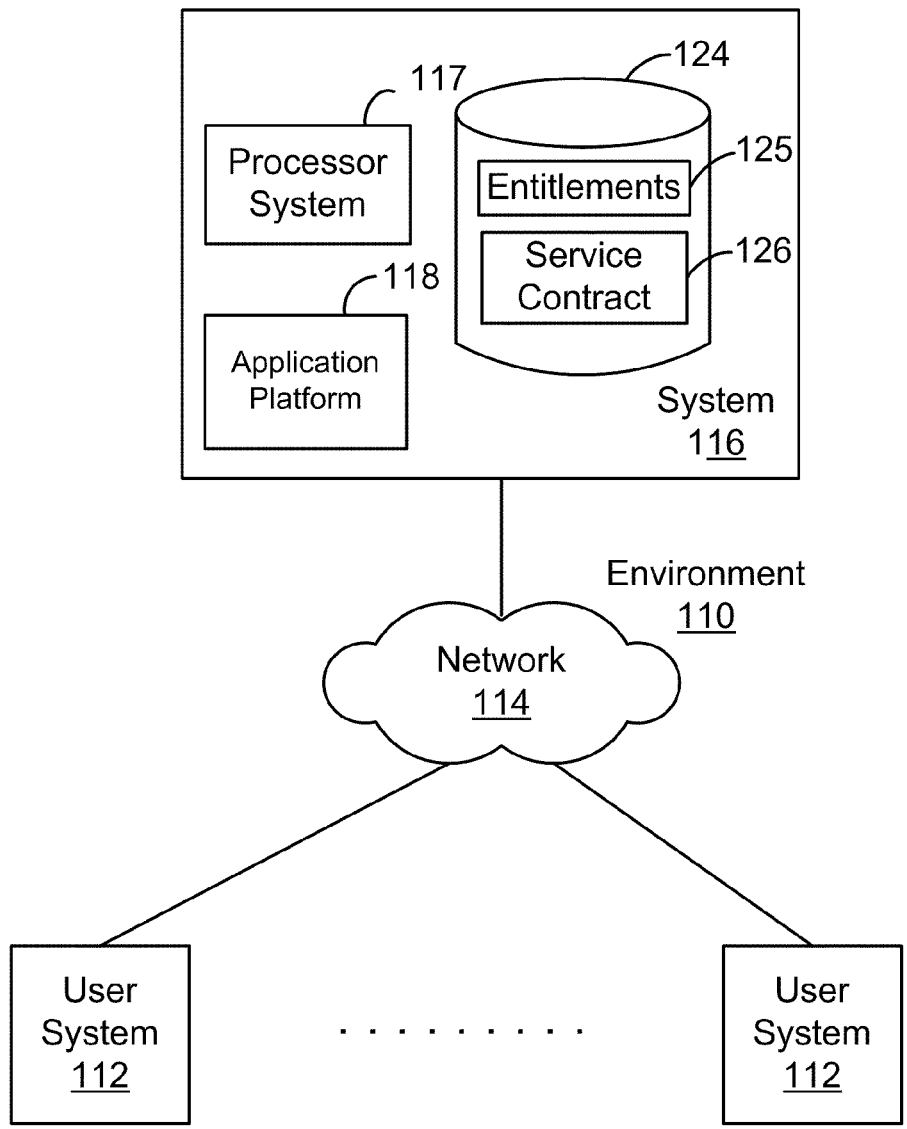
FIG. 1 illustrates a block diagram of an example environment, which may be used to implement the embodiments described herein.

FIG. 1 illustrates a block diagram of an example environment 110, which may be used to implement the embodiments described herein. In one embodiment, environment 110 includes one or more user systems 112, a network 114, and a system 116. In one embodiment, system 116 includes a processor system 117, an application platform 118, and system data storage 124. In one embodiment, system data storage 124 stores information associated with entitlements 125 and information associated with service contracts 126. In other embodiments, environment 110 may not have all of the components listed and/or may have other elements instead of, or in addition to, those listed above.

For ease of illustration, FIG. 1 shows one block for each of user systems 112, processor system 117, and system data storage 124. These blocks 112, 117, and 124 may represent multiple user systems, processor systems, and system data storage units. As described in more detail below, system 116 performs functions for managing entitlement and service contracts.

Figure 2:
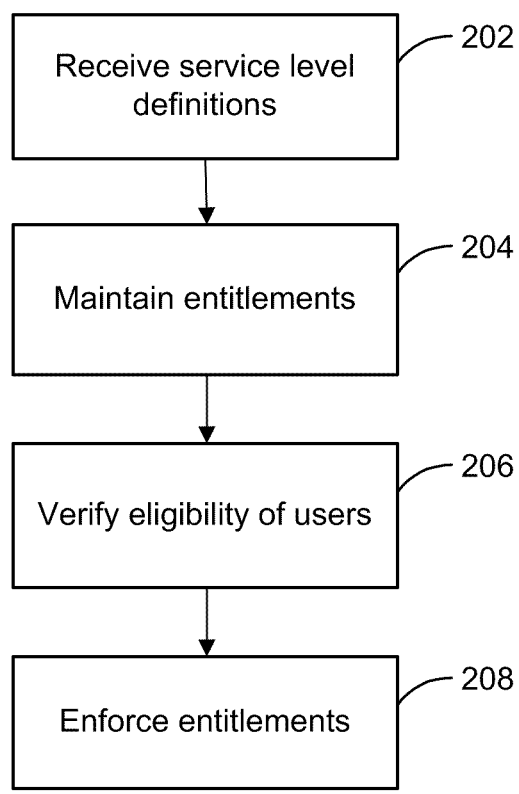
FIG. 2 illustrates an example simplified flow diagram for managing entitlements in a multi-tenant database environment, according to one embodiment.

FIG. 2 illustrates an example simplified flow diagram for managing entitlements in a multi-tenant database environment, according to one embodiment. Referring to both FIGS. 1 and 2, the method is initiated in block 202, where system 116 receives service level definitions for one or more entitlements. In one embodiment, an entitlement may be a service entitlement.

In one embodiment, a service level defines entitlement processes and milestones used to provide support services to customers. In one embodiment, service levels may include tiered service offerings (e.g., platinum level, silver level, gold level, etc.) having different entitlement processes 308 and milestones 310, which may vary by price, asset, etc. In one embodiment, the phrase "service level" and "service level agreement" (SLA) may be used interchangeably.

System 116 receives the service level definitions from users of the on-demand database services system. In one embodiment, a given user may provide information for service level definitions via a user interface at a user system (e.g., user system 112). In one embodiment, a user may be an administrator of the on-demand database services system (e.g., system 116) to provide support products to its customers. In one embodiment, a user may be a customer using the on-demand database services system to provide support products to its partners, resellers, distributors, and/or end-customers. The phrases "support products" and "support programs" are used interchangeably. In one embodiment, system 116 may store the service level definitions in system data storage 124 or in any other suitable storage location.

While system 116 is described as performing the steps as described in the embodiments herein, any suitable component or combination of components of system 116 or any suitable processor or processors associated with system 116 may perform the steps described. For example, the steps may be performed by processor system 917 or process space 928 of FIG. 9, by system process 1002 of FIG. 10, or by any other suitable processor or processors associated with system 116.

In one embodiment, an entitlement may be associated with a service contract, where the service contract contains one or more entitlements. In one embodiment, a service contract may also include subscription contracts, maintenance agreements, warranties, other types of service contracts, etc.

Figure 3:
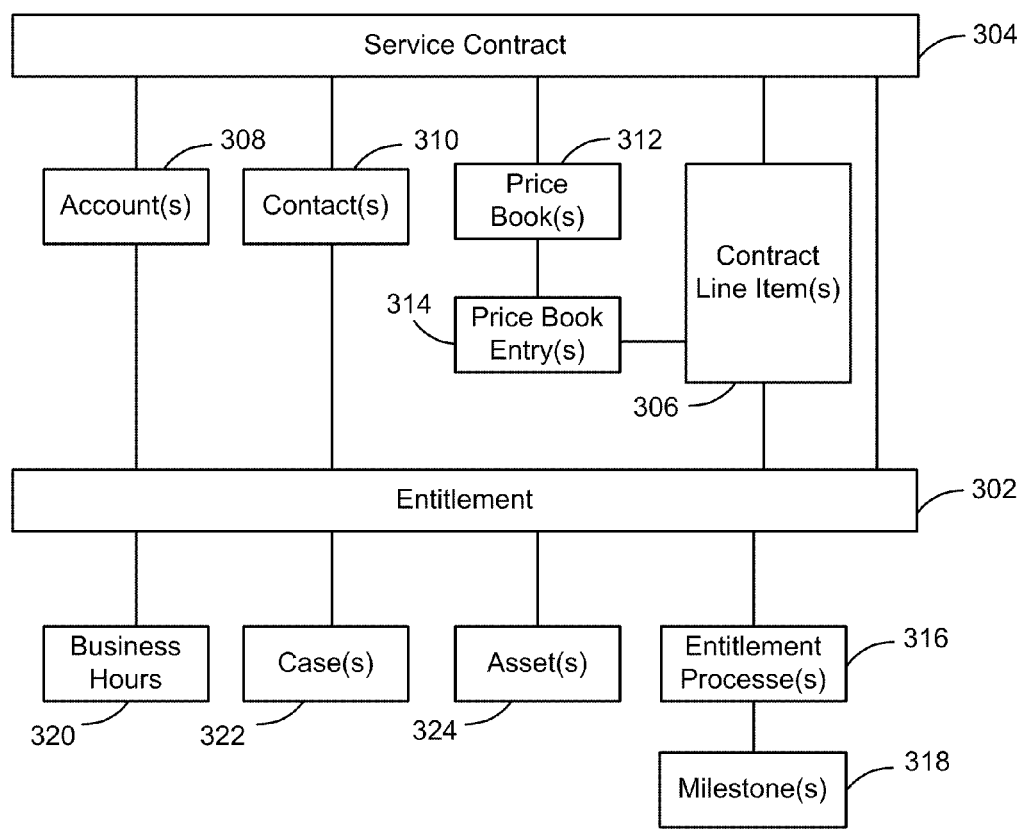
FIG. 3 illustrates an example diagram showing an example entitlement that is associated with a service contract, according to one embodiment.

FIG. 3 illustrates an example diagram showing an example entitlement 302 that is associated with a service contract 304, according to one embodiment. In one embodiment, a customer may be eligible for one or more entitlements as a part of a support product. A support product may be included in a service offering, included in a service upgrade, or may be bundled with a product. In one embodiment, when an order for a support product is made (e.g., a customer purchases a service offering, service upgrade, or product), a contract line item 306 in service contract 304 is created. Such a purchase may involve, for example, a software license, a subscription (e.g., with patches, etc.), a product bundled with the support product, etc. In one embodiment, a service offering may include web support, phone support, training, downloads, etc. In one embodiment, one or more contract line items 306 may indicate one or more support products that were purchased. In one embodiment, entitlement 302 may be at least in part co-termed with service contract 304 (e.g., common end date).

In one embodiment, entitlement 302 and service contract 304 may be associated with one or more accounts 308 (e.g., customer account, partner account, etc.), one or more contacts 310 (e.g., customer contact entitled to call for support). In one embodiment, service contract 304 may be associated with one or more price books 312 and one or more price book entries 314. In one embodiment, contract line items 306 may be based on price book entries 324.

In one embodiment, entitlement 302 is associated with one or more entitlement processes 316 and one or more milestones 318. A service level definition may define the one or more entitlement 316 processes and milestones 318, which are described in more detail below. In one embodiment, a given entitlement process 316 may include definitions of SLA, which may be associated with particular milestones. In one embodiment, SLAs may include service metrics (e.g., response times, resolution times, actions, enforcement rules, etc.). In one embodiment, actions may include warnings (e.g., email alerts), notifications, field updates, outbound messages, creation of tasks, restoring services, etc. For example, actions may also include warnings of actions that have not been completed or that have not been completed by scheduled deadlines associated with specific milestones. In one embodiment, a given entitlement process may include adding milestones. In one embodiment, deadlines to complete milestones may be by-the-minute.

In one embodiment, milestones 318 may include internal and external milestones. Internal milestones may include milestones to be met by the support provider, and external milestones may include milestones to be met by the customer or end-customer. In one embodiment, milestones 318 may be associated with the actions in one or more entitlement processes 316. System 116 may add milestones 318 as needed.

In one embodiment, an entitlement may be associated with a case 320. In one embodiment, a given case 320 may be opened in order to address issues associated with an entitlement. This enables services for providing support to customers who are entitled to support, and ensures that customers receive the correct level of service.

In one embodiment, a case may include several fields. For example, one or more criteria fields may be used to define in what cases a given milestone will apply. In one embodiment, such criteria fields may include criteria indicating priority and/or severity. In one embodiment, the higher the priority of a case, the tighter (shorter) the time required to resolve the case according to the service level definitions. In one embodiment, criteria fields may also include customer and product attributes. In one embodiment, one or more case origin fields may be used in milestone criteria to handle cases such as phone support, which may or may not require a first response.

In one embodiment, one or more success fields may be used to update workflow actions for each of the milestones associated with a given case. In one embodiment, one or more Boolean fields may be used for each milestone completed (e.g., first response completed, etc.). In one embodiment, a Boolean field may be set to true by the field update workflow action. Then, a trigger monitors the Boolean field and grabs a milestone completion date when it is set to true and copies the completion date to another field (e.g., first response completion date).

In one embodiment, an entitlement may be associated with particular business hours 322. In one embodiment, the times that actions may be performed may be during business hours of the customer receiving support (with exceptions such as holidays).

In one embodiment, an entitlement may be associated with an asset 324. An asset 324 may be an instance of a product, a service offering, a service upgrade, etc. In one embodiment, one or more entitlements may cover a specific asset (e.g., product, service product, etc.) that a customer has purchased. In other words, an asset may be covered by one or more entitlements. In one embodiment, multiple assets may be covered by the same entitlement.

The relationships of elements of FIG. 3 are not limited to the configuration shown in FIG. 3. In other embodiments, other configurations are possible. Furthermore, other embodiments may have other elements instead of, or in addition to, those shown in FIG. 3.

In block 204, system 116 maintains entitlements. In one embodiment, system 116 may maintain entitlements by creating new entitlements, modifying existing entitlements, extending entitlements, and renewing entitlements. In one embodiment, each entitlement may be associated with a user (e.g., customer, end-customer, etc.). In one embodiment, system 116 may maintain entitlements when new assets are created (e.g., new product, new service product such as a standard warranty entitlement, etc.), when new contract line items in a service contract are created, etc.

In one embodiment, system 116 generates new entitlements from entitlement templates using default values. In one embodiment, an entitlement template may be used to model different services that are sold or included in product sales to customers and partners. For example, different service may include web support, phone support, training, downloads, etc. In one embodiment, each entitlement template may be associated (e.g., bundled) with a particular product. Such template-product associations may be defined in the service level definitions.

In one embodiment, system 116 may create entitlements when creating assets (e.g., standard warranty entitlements) and when adding contract line items (e.g., service products can bundle one or more entitlements). In one embodiment, system 116 may manage which customer contacts are entitled to a given entitlement, and delegate/require end-customers to manage their own entitlements via a user interface (UI) or application programming interface (API).

In one embodiment, system 116 may generate entitlements and related service contracts, warranties, etc. for new customers or for existing customers (e.g., associated with data migration efforts). In one embodiment, account, contact, asset, and product relationships are all supported.

In one embodiment, system 116 may also maintain service contracts, where each service contract may be associated with a user (e.g., customer, end-customer, etc.). In one embodiment, system 116 may maintain service contracts by creating new service contracts, modifying existing service contracts (e.g., adding, removing, or modifying contract line items), extending service contracts, and renewing service contracts.

In one embodiment, system 116 may maintain a service contract using the same data model with opportunities and quotes including price books. In one embodiment, a service contract may be created via an application programming interface (API) such that the service contract easily integrates with external order management systems.

In one embodiment, system 116 may maintain a service contract from an order when a customer purchases a subscription, maintenance agreement, or a warranty. This may be done explicitly via a service product as a line item on the order, or it may be bundled as part of a sales product. In one embodiment, the order may reside in an external order management system.

In one embodiment, system 116 may maintain a service contract via integration with an external system, which may provide additional service contract information. In this scenario, a service contract may contain a subset of the information that a records system may maintain. Such information may include customer information, and is used for integrating with the sales and renewal processes.

In one embodiment, service contract renewal opportunities may be created based on existing service contracts. For example, in one embodiment, system 116 may create renewal opportunities based on contract expiration (e.g., effective dates).

In block 206, system 116 verifies if one or more users are eligible for the entitlements. In one embodiment, system 116 performs the verification when a given user requests a particular support service. System 116 then determines whether the requesting user is eligible for the request service, and determines what service level of support the user is entitled to. In one embodiment, system 116 may verify a given user in a number of ways (e.g., by account, contact, asset, service contract, contract line item, product relationship, etc.)

In block 208, system 116 enforces the entitlements based on the service level definitions. In one embodiment, enforcing the entitlements includes enforcing rules (e.g., business rules) and service level details defined in the service level definitions. In one embodiment, the rules are enforced by performing actions in one or more entitlement processes defined in the service level definitions. In one embodiment, if a given customer is not eligible for a particular entitlement, the system may notify the customer of the ineligibility.

In one embodiment, the actions may be associated with email alerts, field updates, outbound messages, creation of tasks, etc. Actions may also be associated with warnings of actions not being completed or not being completed by scheduled deadlines associated with specific milestones.

As described in detail below in FIGS. 4-8, system 116 provides a timeline control that facilitates a user in defining reference data for entitlements, which may include entitlement processes and associated milestones (e.g., service metrics, SLAs) that need to be enforced. The timeline control provides a set up or administrative function for creating and managing the reference data for entitlement processes. The timeline control also provides a tool for tracking the progress of actions that need to be performed and milestones that need to be achieved (e.g., by users such as a call center agent or a technical support).

Figure 4:
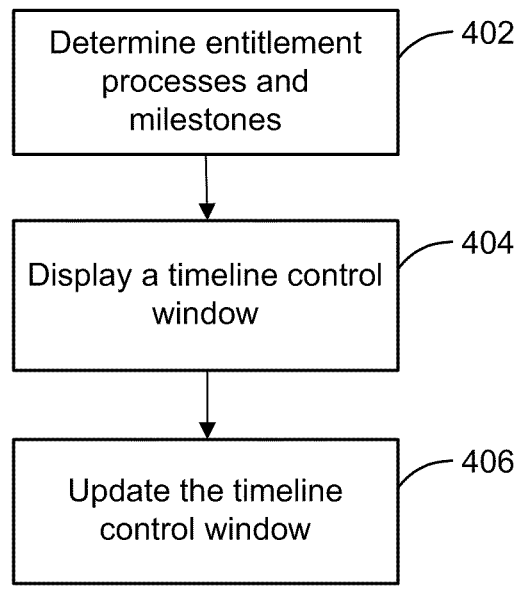
FIG. 4 illustrates an example simplified flow diagram for providing a timeline control in a multi-tenant database environment, according to one embodiment.

FIG. 4 illustrates an example simplified flow diagram for providing a timeline control in a multi-tenant database environment, according to one embodiment. In one embodiment, the method is initiated in block 402, where the system 116 determines a plurality of entitlement processes and milestones that are to be enforced. In one embodiment, system 116 determines the entitlement processes and milestones from the service level definitions. In one embodiment, each entitlement process includes one or more actions, where each action is associated with a corresponding milestone.

In block 404, system 116 displays a timeline control window in a user interface. In one embodiment, a timeline control window may be generated and made available for display for each entitlement process determined from the service level definitions. In one embodiment, the user interface may be accessible to a user via a user system such as user system 112 of FIG. 1.

As shown in more detail below, in one embodiment, the enforcement of the service levels is time-dependent. For example, in one embodiment, an entitlement process may define a timeline that includes all of the actions and milestones that a support team should complete to resolve a given case. These actions and milestones may be summarized in the timeline control window. Each entitlement process includes business logic necessary to enforce the correct service level for a given customer.

Figure 5:
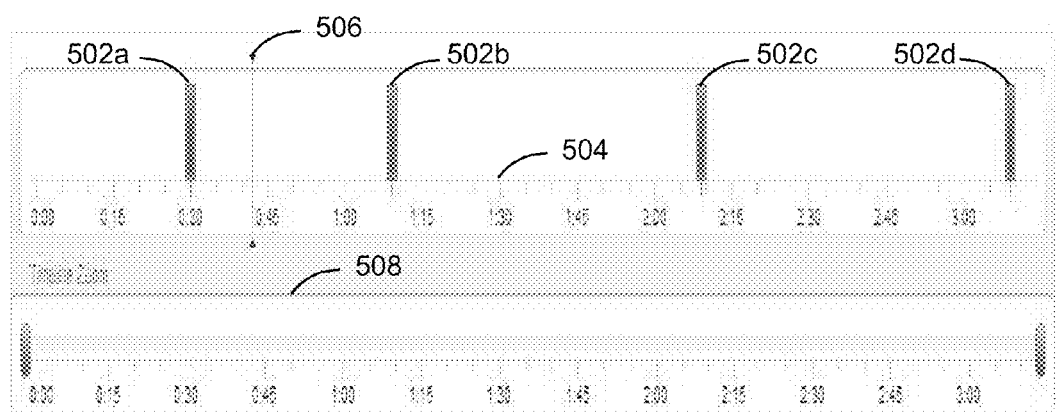
FIG. 5 illustrates an example screen shot that includes a timeline control window, according to one embodiment.

FIG. 5 illustrates an example screen shot that includes a timeline control window 500, according to one embodiment. As FIG. 5 shows, the timeline control window 500 includes one or more milestone indicators 502 (labeled 502a, 502b, 502c, and 502d) that are positioned along a time axis 504, where each milestone indicator 502 indicates a deadline for an action. In one embodiment, these actions are action associated with an entitlement process determined from the service level definitions. For ease of illustration, only four milestone indicators 502a-502d are shown. More milestones indicators are possible, depending on the particular embodiment. As FIG. 5 shows, deadlines associated with milestones may be based on minute-level granularity.

In this example, the following actions may need to be performed by particular times from when the case was opened: provide a first response (e.g., by 30 minutes), reproduce issues (e.g., by 1 hour and 10 minutes), suggest a workaround (e.g., by 2 hours and 10 minutes), reach a resolution time (e.g., by 3 hours and 10 minutes). More actions may be possible, depending on the particular embodiment.

In one embodiment, timeline control window 500 also includes a time indicator 506 that indicates the current time of the entitlement process relative to a start time. In one embodiment, time indicator 506 moves along timeline 504, progressing from a start time 0:00 and indicates the actual time from the start time 0:00. In one embodiment, the start time 0:00 may represent when a case was opened, triggering a requirement to perform entitlement processes. In this example, the time indicator 506 is positioned at about 0:42, which indicates that the current time of the entitlement process is about 42 minutes after the case was opened.

In one embodiment, timeline control window 400 also includes a timeline zoom window 508, which enables a user to zoom into a particular time period.

In block 406, system 116 updates the timeline control window as the status of the entitlement process changes. For example, in one embodiment, system 116 may indicate in the timeline control window 500 whether a given milestone has been completed or not, and if the metrics associated with the given milestone are successfully satisfied.

In one embodiment, system 116 may color code the milestone indicators 502 to distinguish between milestones that have not yet been completed and those that have been completed. For example, in one embodiment, system 116 may display milestone indicators 502 in a first color (e.g., blue) if the milestone has not been completed, and may change milestone indicators 502 to a second color (e.g., red) when the milestone is completed.

In one embodiment, system 116 may use other markings to distinguish between milestones that have not yet been completed and those that have been completed. For example, in one embodiment, system 116 may display milestone indicators 502 without displaying any completion indicator (e.g., an absence of any completion indicator) if the milestone has not been completed. Conversely, system 116 may display a completion indicator (e.g., indicating if a given milestone is incomplete, late, completed, etc.).

Figure 6:
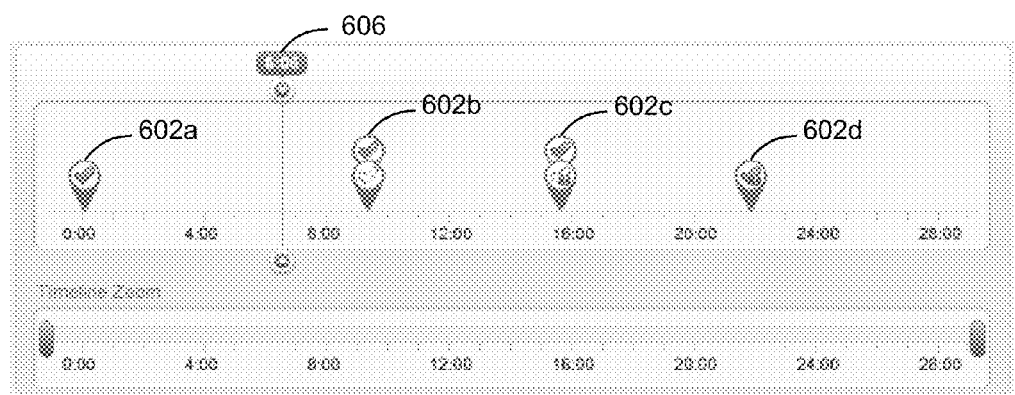
FIG. 6 illustrates an example screen shot that includes a timeline control window, according to one embodiment.

FIG. 6 illustrates an example screen shot that includes a timeline control window 600, according to one embodiment. As FIG. 6 shows, the timeline control window 600 includes one or more milestone indicators 602 (labeled 602a, 602b, 602c, and 602d). In this particular embodiment, completion check marks are used to indicate whether milestones have been completed.

In one embodiment, timeline control window 600 includes a time indicator 606 that indicates the current time of the entitlement process. In one embodiment, time indicator 606 moves along a timeline, progressing from a start time 0:00 and indicates the actual time from the start time 0:00. In one embodiment, time indicator 606 shows not only the current time in relation to the timeline, but the current time also by actually displaying the time (e.g., 6:06) relative to the start time (e.g., 0:00).

While milestone indicators 602 are shown as inverted cones with a circular region for completion check marks, milestone indicators may have other forms, such as bars, as shown in FIG. 5.

Figure 7:
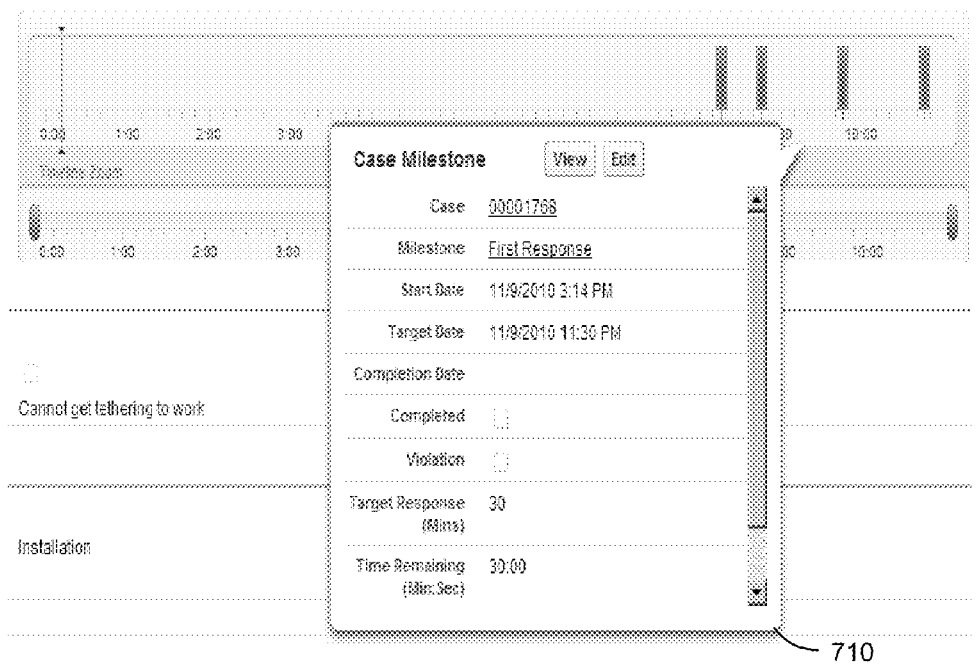
FIG. 7 illustrates an example screen shot that includes a timeline control window and a case milestone window, according to one embodiment.

FIG. 7 illustrates an example screen shot that includes a timeline control window 700 and a case milestone window 710, according to one embodiment. In one embodiment, a case milestone window associated with a given milestone may pop up when the user clicks on the given milestone. In one embodiment, a case milestone window may display information associated with the status of particular milestone, such as a case identification (e.g., 00001768), a type of milestone (e.g., first response), start date (e.g., Nov. 9, 2010 3:14 PM), target date (e.g., Nov. 9, 2010 11:30 PM), completion date, completion indicator, violation indicator, target response time period (e.g., 30 minutes), time remaining until milestone deadline (e.g., 30 minutes).

Figure 8:
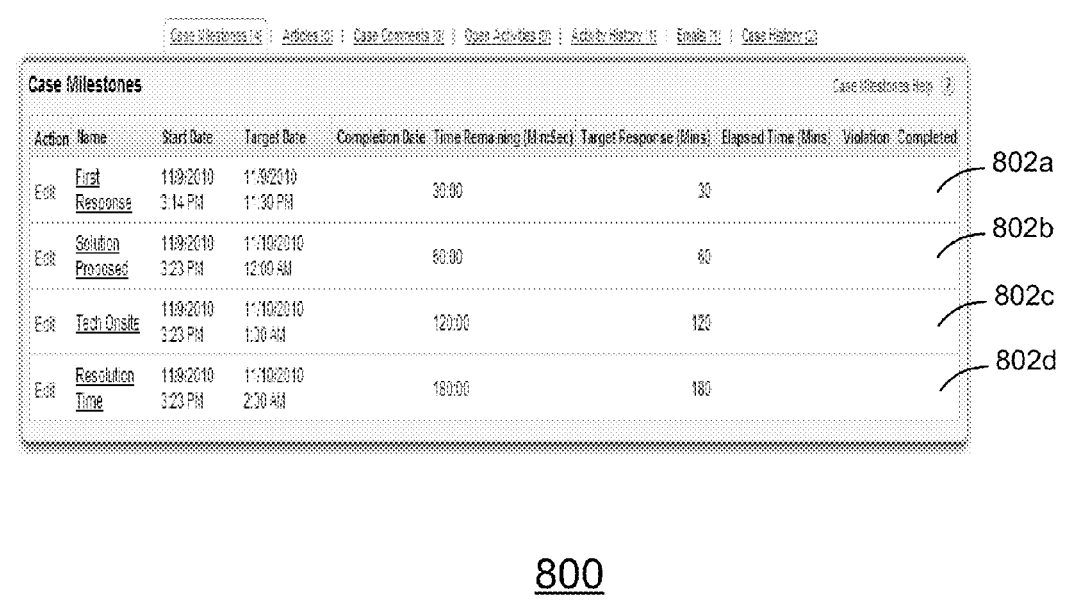

FIG. 8 illustrates an example screen shot that includes a case milestones summary window 800, according to one embodiment. In one embodiment, case milestones summary window 800 shows records 802 (labeled 802a, 802b, 802c, and 802d) that include the milestones associated with a particular entitlement process. In one embodiment, system 116 may provide a selection button to enable a user to view summary window 800. While only case milestones summary window 800 is shown in FIG. 8, system 116 may also overlay case milestones summary window 800 on top of a timeline control window (similar to FIG. 7, where case milestone window 710 overlays on top of timeline control window 700). Furthermore, in one embodiment, the information displayed in case milestones summary window 800 corresponds to the information displayed in its associated timeline control window.

As FIG. 8 shows, for each milestone shown, system 116 may display information associated with the status of each milestone, such as a case identification, a type of milestone, start date, target date, completion date, completion indicator, violation indicator, target response time period, time remaining until milestone deadline, etc.

As indicated above, milestones may be of different types. For example, in one embodiment, enforcement may involve a first response milestone and a resolution time. In one embodiment, a first response milestone may represent how quickly a support organization should respond to a customer case. This may be referred to as a response time or an initial response. In one embodiment, an initial response time may be defined as the elapsed time from when a case is opened until a member of the support organization starts diagnosing the problem. In one embodiment, a response time may be marked by notifying the customer (e.g., either via email, a comment on the case, or both) that his or her issue is being addressed. In one embodiment, an auto-response email would not generally be acceptable as a first response, because it would rarely result in a service agent or support engineer beginning to analyze and work the case.

In one embodiment, a resolution time may be the time required to successfully resolve a customer issue. This may be, for example, the time required to fix the root cause of a case or the time required to provide a satisfactory workaround. In one embodiment, the resolution time may be the elapsed time between when a case is opened until it is resolved to the customer's satisfaction. More specifically, it will be the time from when a case was created until the case status is set to "closed," and a date/time closed field is set with a value earlier than or equal to the current date.

In one embodiment, system 116 instructs representatives of the database system on how to resolve cases. In one embodiment, system 116 displays a user interface to a user in order to show a timeline of a series of associated actions, including associated milestones.

Embodiments described herein provide numerous benefits. For example, embodiments facilitate determining and verifying what entitlements a particular user is eligible for. Embodiments facilitate enforcement of rules (e.g., SLAs) across a customer base, which saves costs by limiting particular support products to eligible customers. Furthermore, embodiments provide timeline control windows, case milestone windows, and case milestone summary windows to enable users to successfully and carry out actions in a timely way in accordance with entitlement processes and milestones as defined in the service level definitions for the entitlements. Supporting only eligible customers ensures sufficient resources to provide appropriate service quality and thus customer satisfaction.

Figure 9:
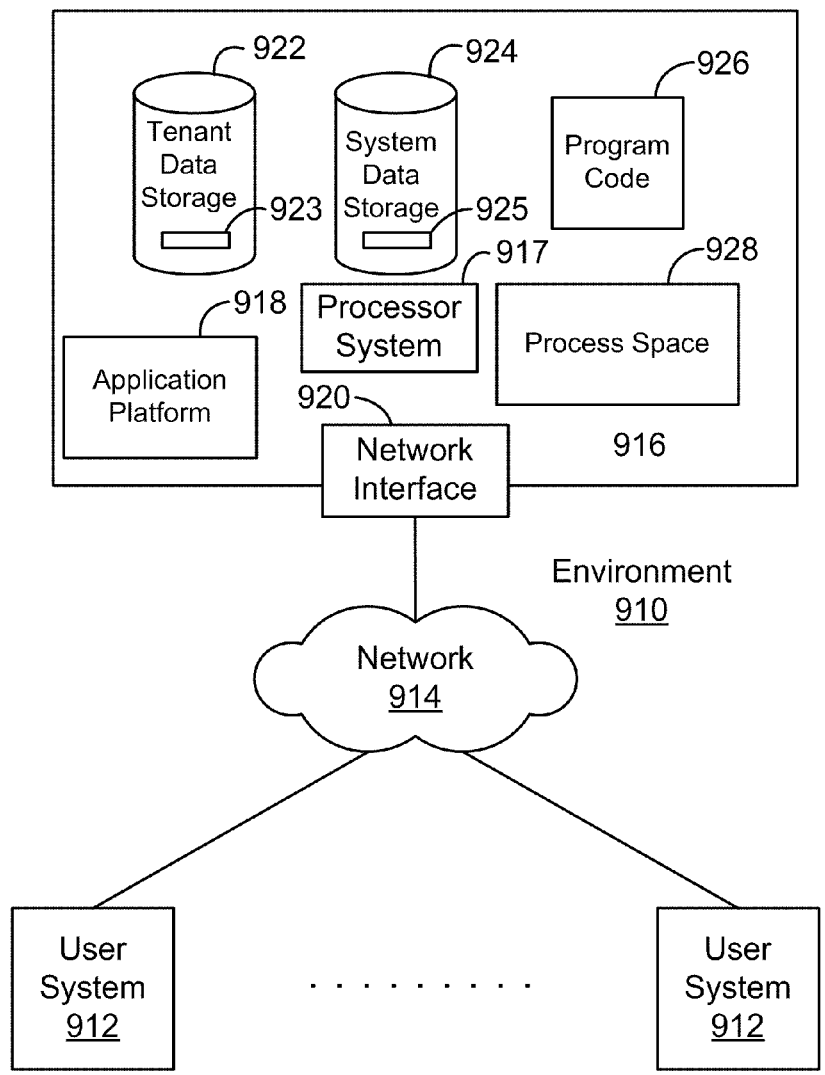
FIG. 9 illustrates a block diagram of an example environment where a database service might be used, and which may be used to implement the embodiments described herein.

FIG. 9 illustrates a block diagram of an example environment 910 where a database service might be used, and which may be used to implement the embodiments described herein. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916. System 916 may also be referred to as a cloud service provider. System 916 provides its resources to customers (e.g., end users) as a service.

An on-demand database service, such as system 916, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, system 916 may include an application platform 918 that enables creating, managing, and executing one or more applications developed for an on-demand database service, for users accessing the on-demand database service via user systems 912, or for third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 912 might communicate with system 916 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as to provide related data, code, forms, webpages and other information to and from user systems 912. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party application developer) software applications, which may or may not include CRM, may be supported by the application platform 918, which manages the creation and storage of the applications into one or more database objects, and executing of the applications in a virtual machine in the process space of the system 916. The terms "application," "software application," "software package," "software code," and "program code" are used interchangeably.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 616 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
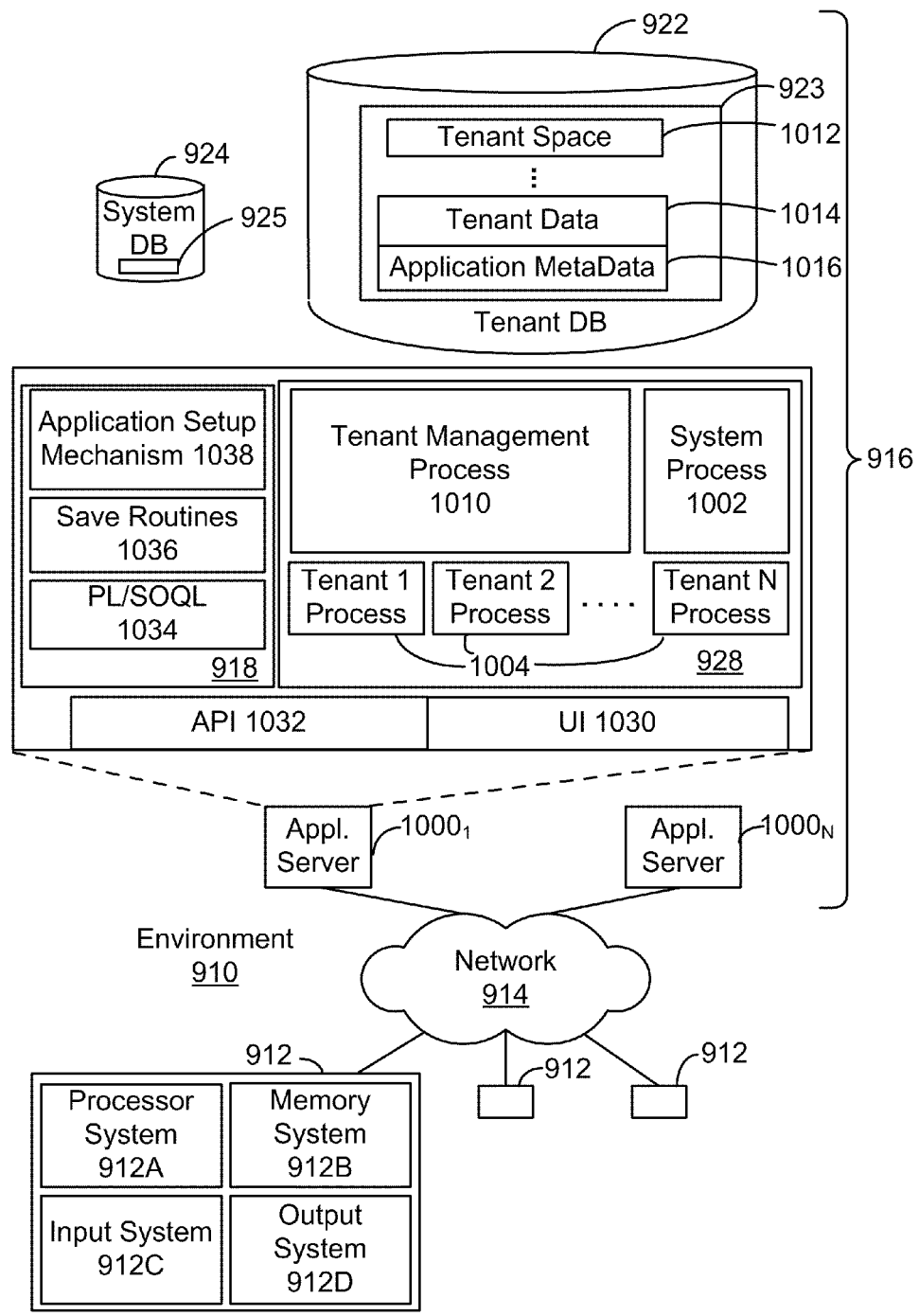
FIG. 10 illustrates a block diagram of another example environment, which may be used to implement the embodiments described herein.

FIG. 10 illustrates a block diagram of another example environment 910, which may be used to implement the embodiments described herein. FIG. 10 also illustrates elements of system 916 and various interconnections, according to one embodiment. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, user interface (UI) 1030, application program interface (API) 1032, PL/Salesforce.com object query language (PL/SOQL) 1034, save routines 1036, application setup mechanism 1038, applications servers 10001-1000N, system process space 1002, tenant process spaces 1004, tenant management process space 1010, tenant storage area 1012 (labeled "Tenant Space 1012" in FIG. 10), user storage 1014 (labeled "Tenant Data 1014" in FIG. 10), and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown in FIG. 9, system 916 may include a network interface 920 (of FIG. 9) implemented as a set of HTTP application servers 700, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes and to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010, for example. Invocations to such applications may be coded using PL/SOQL 1034 that provides a programming language style interface extension to API 1032. Invocations to applications may be detected by one or more system processes, which manage retrieving application metadata 1016 for the subscriber, making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer control protocol and Internet protocol (TCP/IP) are typical protocols for communicating between application servers 1000 and the database system. However, it will be apparent to one skilled in the art that other transport protocols may be used to optimize the system depending on the network connection used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles the storage of, and access to, different objects, data and applications across disparate users and organizations.

As an example of storage, one tenant might be a company that employs a sales force where each salesperson uses system 616 to manage his or her sales process. Thus, a user might maintain contact data, leads data, customer follow-up data, performance data, goals and progress data, etc., all applicable to that user's personal sales process (e.g., in tenant data storage 622). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more structured query language (SQL) statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for providing timeline control of entitlement processes in a multi-tenant database system, the method comprising:
    storing, by a processor of the multi-tenant database system, one or more service level agreements that are defined for one or more tenants in the multi-tenant database system to provide support services to customers, wherein the one or more service level agreements are associated with one or more entitlement processes and milestones and wherein the one or more entitlement processes and milestones are created using an entitlement template and an associated set of service level definitions;
    identifying, by a processor of the multi-tenant database system, the one or more entitlement processes and milestones associated with a tenant in the multi-tenant database system from the one or more service level agreements, wherein the one or more entitlement processes and milestones include one or more defined actions to be taken upon reaching a corresponding milestone, and wherein the identifying automatically occurs when at least one of an asset is created and a contract line item is created in the one or more service level agreements;
    receiving, by a processor of the multi-tenant database system, a request to view one of the one or more entitlement processes and milestones, wherein the request is generated from an interface displayed on a display;
    identifying, by a processor of the multi-tenant database system, the one of the one or more entitlement processes and milestones;
    retrieving, by a processor of the multi-tenant database system, information about the requested entitlement processes and milestones, wherein the information includes instructions to generate a visual representation of a timeline;
    sending, by a processor of the multi-tenant database system, the information about the requested entitlement processes and milestones to a client device to be rendered in a timeline control window of a display that shows one or more milestones for an entitlement process; and
    sending, by a processor of the multi-tenant database system, an update to the information as the status of the entitlement process changes.

2. The method of claim 1, wherein the timeline control window comprises a time indicator that indicates the current time of the entitlement process.

3. The method of claim 1, further comprising indicating in the timeline control window whether a given milestone has been completed or not.

4. The method of claim 1, further comprising indicating in the timeline control window whether a given milestone has been completed or not by displaying a completion indicator.

5. The method of claim 1, further comprising color coding the milestone indicators to distinguish between milestones that have not yet been completed and those that have been completed.

6. The method of claim 1, further comprising displaying a case milestone window associated with at least one milestone, wherein the case milestone window includes information associated with a status of a particular milestone.

7. The method of claim 1, further comprising:
    determining an eligible user of a first entitlement process from users of the multi-tenant database system, and
    wherein the displaying the timeline control window comprises displaying the timeline control window to the eligible user that shows one or more milestones for the first entitlement process.

8. A non-transitory computer-readable storage medium carrying one or more sequences of instructions thereon for providing a timeline control of entitlement processes, the instructions when executed by a processor cause the processor to:
    storing, by the multi-tenant database system, one or more service level agreements that are defined for one or more tenants in the multi-tenant database system to provide support services to customers, wherein the one or more service level agreements are associated with one or more entitlement processes and milestones and wherein the one or more entitlement processes and milestones are created using an entitlement template and an associated set of service level definitions;
    identifying, by the multi-tenant database system, the one or more entitlement processes and milestones associated with a tenant in the multi-tenant database system from the one or more service level agreements, wherein the one or more entitlement processes and milestones include one or more defined actions to be taken upon reaching a corresponding milestone, and wherein the identifying automatically occurs when at least one of an asset is created and a contract line item is created in the one or more service level agreements;
    receiving, by the multi-tenant database system, a request to view one of the one or more entitlement processes and milestones, wherein the request is generated from an interface displayed on a display;
    identifying, by the multi-tenant database system, the one of the one or more entitlement processes and milestones;
    retrieving, by the multi-tenant database system, information about the requested entitlement processes and milestones, wherein the information includes instructions to generate a visual representation of a timeline;
    sending, by the multi-tenant database system, the information about the requested entitlement processes and milestones to a client device to be rendered in a timeline control window of a display that shows one or more milestones for an entitlement process; and
    sending, by multi-tenant database system, an update to the information as the status of the entitlement process changes.

9. The non-transitory computer-readable storage medium of claim 8, wherein the timeline control window comprises a time indicator that indicates the current time of the entitlement process.

10. The non-transitory computer-readable storage medium of claim 8, wherein the instructions further cause the processor to indicate in the timeline control window whether a given milestone has been completed or not.

11. The non-transitory computer-readable storage medium of claim 8, wherein the instructions further cause the processor to indicate in the timeline control window whether a given milestone has been completed or not by displaying a completion indicator.

12. The non-transitory computer-readable storage medium of claim 8, wherein the instructions further cause the processor to color code the milestone indicators to distinguish between milestones that have not yet been completed and those that have been completed.

13. The non-transitory computer-readable storage medium of claim 8, wherein the instructions further cause the processor to display a case milestone window associated with at least one milestone, wherein the case milestone window includes information associated with a status of a particular milestone.

14. An apparatus for providing a timeline control of entitlement processes, the apparatus comprising:
   a processor; and
   a storage device storing one or more stored sequences of instructions which when executed by the processor cause the processor to:
   storing, by the multi-tenant database system, one or more service level agreements that are defined for one or more tenants in the multi-tenant database system to provide support services to customers, wherein the one or more service level agreements are associated with one or more entitlement processes and milestones and wherein the one or more entitlement processes and milestones are created using an entitlement template and an associated set of service level definitions;
   identifying, by the multi-tenant database system, the one or more entitlement processes and milestones associated with a tenant in the multi-tenant database system from the one or more service level agreements, wherein the one or more entitlement processes and milestones include one or more defined actions to be taken upon reaching a corresponding milestone, and wherein the identifying automatically occurs when at least one of an asset is created and a contract line item is created in the one or more service level agreements;
   receiving, by the multi-tenant database system, a request to view one of the one or more entitlement processes and milestones, wherein the request is generated from an interface displayed on a display;
   identifying, by the multi-tenant database system, the one of the one or more entitlement processes and milestones;
   retrieving, by the multi-tenant database system, information about the requested entitlement processes and milestones, wherein the information includes instructions to generate a visual representation of a timeline;
   sending, by the multi-tenant database system, the information about the requested entitlement processes and milestones to a client device to be rendered in a timeline control window of a display that shows one or more milestones for an entitlement process; and
   sending, by multi-tenant database system, an update to the information as the status of the entitlement process changes.

15. The apparatus of claim 14, wherein tile timeline control window comprises a time indicator that indicates the current time of the entitlement process.

16. The apparatus of claim 14, wherein the instructions further cause the processor to indicate in the timeline control window whether a given milestone has been completed or not.

17. The apparatus of claim 14, wherein the instructions further cause the processor to indicate in the timeline control window whether a given milestone has been completed or not by displaying a completion indicator.

18. The apparatus of claim 14, wherein the instructions further cause the processor to color code the milestone indicators to distinguish between milestones that have not yet been completed and those that have been completed.

* * * * *